US009213339B2

(12) United States Patent
Nashery et al.

(10) Patent No.: US 9,213,339 B2
(45) Date of Patent: Dec. 15, 2015

(54) FLUID REGULATOR HAVING IMPROVED FLOW STABILITY

(71) Applicant: EMERSON PROCESS MANAGEMENT REGULATOR TECHNOLOGIES, INC., McKinney, TX (US)

(72) Inventors: Khashayar A. Nashery, Dallas, TX (US); Douglas J. Scheffler, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 253 days.

(21) Appl. No.: 13/830,345

(22) Filed: Mar. 14, 2013

(65) Prior Publication Data

US 2013/0255791 A1   Oct. 3, 2013

Related U.S. Application Data

(60) Provisional application No. 61/618,557, filed on Mar. 30, 2012.

(51) Int. Cl.
*F16K 31/12* (2006.01)
*G05D 7/00* (2006.01)
*G05D 16/06* (2006.01)

(52) U.S. Cl.
CPC .............. *G05D 7/00* (2013.01); *G05D 16/0602* (2013.01); *G05D 16/0672* (2013.01); *G05D 16/0683* (2013.01); *Y10T 137/0379* (2015.04); *Y10T 137/7764* (2015.04)

(58) Field of Classification Search
CPC . G05D 7/00; G05D 16/0683; G05D 16/0672; G05D 16/0602; G05D 16/0675; Y10T 137/7764; Y10T 137/0379

USPC ......... 137/12, 505.12, 505.25, 505.3, 505.36, 137/505.37, 505.47
See application file for complete search history.

(56) References Cited

U.S. PATENT DOCUMENTS 1,946,188 A * 2/1934 Birch ........................ 137/505.41
2,314,266 A * 3/1943 Beam .......................... 236/80 R
(Continued)

FOREIGN PATENT DOCUMENTS

DE   43 30 483 A1   3/1995
GB   1413928 A   11/1975

OTHER PUBLICATIONS

International Search Report and Written Opinion for Application No. PCT/US2013/034080, dated Sep. 5, 2013.
(Continued)

*Primary Examiner* — Jessica Cahill
(74) *Attorney, Agent, or Firm* — Marshall, Gerstein & Borun LLP

(57) ABSTRACT

A fluid regulator includes a regulator body having a fluid inlet and a fluid outlet connected by a fluid flow path, with a portion of the regulator body forming a first chamber and a second chamber, an orifice disposed in the fluid flow path, a seat, and a control element disposed within the fluid flow path and shiftable between an open position spaced away from the seat and a closed position seated against the seat, with the control element arranged to respond to fluid pressure changes to control flow of a process fluid through the orifice. A first diaphragm having a radially inner portion is operatively coupled to the control element, and a second diaphragm having a radially inner portion also is operatively coupled to the control element.

20 Claims, 5 Drawing Sheets

(56) References Cited

U.S. PATENT DOCUMENTS

| | | | | |
|---|---|---|---|---|
| 2,328,279 A | * | 8/1943 | Jones | 236/80 R |
| 2,412,490 A | * | 12/1946 | Biggle | 137/505.12 |
| 2,806,481 A | * | 9/1957 | Faust | 137/116.5 |
| 3,001,535 A | | 9/1961 | Mueller | |
| 3,123,094 A | * | 3/1964 | Toschkoff | 137/505.13 |
| 3,270,757 A | | 9/1966 | Engler | |
| 3,276,462 A | * | 10/1966 | Matchett | 137/505.12 |
| 3,392,749 A | * | 7/1968 | Gneiding et al. | 137/484.6 |
| 5,107,887 A | * | 4/1992 | White et al. | 137/505.42 |
| 5,740,833 A | * | 4/1998 | Olds et al. | 137/505.12 |
| 2006/0185736 A1 | * | 8/2006 | Cavagna | 137/505.12 |
| 2008/0110506 A1 | * | 5/2008 | Igarashi | 137/488 |

OTHER PUBLICATIONS

International Preliminary Report on Patentability for International application No. PCT/US2013/034080, dated Oct. 1, 2014.

* cited by examiner

FLUID REGULATOR HAVING IMPROVED FLOW STABILITY

FIELD OF THE INVENTION

The present disclosure generally relates to fluid control devices such as gas or fluid regulators and, more particularly, to a fluid regulator having a pair of diaphragms engaging a control element.

DESCRIPTION OF THE PRIOR ART

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented in these distribution systems in order to ensure that the delivered gas meets the requirements of the end-user facilities. Conventional gas regulators generally include a closed-loop control actuator for sensing and controlling the pressure of the delivered gas.

Fluid regulators typically employed in such gas distribution systems are generally well known in the art. One type of fluid regulator is a single stage pressure regulator, which acts to reduce the incoming or source pressure to the outlet or delivery pressure in a single step. Another type of fluid regulator is a dual stage regulator, which reduces the inlet pressure to the outlet pressure in two steps.

In pressure regulators, a number of environmental and/or mechanical factors can affect regulator performance. Accordingly, it may be desirable to provide a fluid or gas regulator exhibiting reduced or minimized adverse effects due to environmental and/or mechanical factors.

SUMMARY

In accordance with a first exemplary aspect, a dual stage fluid regulator includes a regulator body having a fluid inlet and a fluid outlet connected by a fluid flow path, a portion of the regulator body forming a first chamber and a second chamber, a first stage orifice disposed in the fluid flow path and leading to a first stage seat, a second stage orifice disposed in the fluid flow path and leading to a second stage seat, a first stage control element disposed within the fluid flow path and shiftable between an open position spaced away from the first stage seat and a closed position seated against the first stage seat, the first stage control element arranged to respond to fluid pressure changes to control flow of a process fluid through the first stage orifice, and a second stage control element disposed within the fluid flow path and shiftable between an open position spaced away from the second stage seat and a closed position seated against the second stage seat. An actuator is attached to the regulator body, the actuator operatively coupled to the second stage control element and arranged to respond to fluid pressure changes in the fluid outlet to move the second stage control element between the open position and the closed position to control flow of the process fluid through the second stage orifice. The first stage control element is operatively coupled to a first diaphragm and a second diaphragm, with the first and second diaphragms disposed between the first chamber and the second chamber.

In accordance with a second exemplary aspect, a method of improving stability in a dual stage regulator includes the steps of providing a conventional dual stage fluid regulator having a regulator body, a fluid inlet and a fluid outlet connected by a fluid flow path with a portion of the regulator body forming a first chamber and a second chamber, the regulator further having a first stage orifice disposed in the fluid flow path and leading to a first stage seat, a second stage orifice disposed in the fluid flow path and leading to a second stage seat, a first stage control element disposed within the fluid flow path and shiftable between an open position spaced away from the first stage seat and a closed position seated against the first stage seat, the first stage control element arranged to respond to fluid pressure changes to control flow of a process fluid through the first stage orifice, and a second stage control element disposed within the fluid flow path and shiftable between an open position spaced away from the second stage seat and a closed position seated against the second stage seat, the regulator further having an actuator attached to the regulator body, the actuator operatively coupled to the second stage control element and arranged to respond to fluid pressure changes in the fluid outlet to move the second stage control element between the open position and the closed position to control flow of the process fluid through the second stage orifice. The method includes providing a first diaphragm, positioning the first diaphragm between the first chamber and the second chamber, coupling a radially inner portion of the first diaphragm to the first stage control element, providing a second diaphragm, and coupling a radially inner portion of the second diaphragm to the first stage control element.

In accordance with a third exemplary aspect, a dual stage fluid regulator includes a regulator body having a fluid inlet and a fluid outlet connected by a fluid flow path, with a portion of the regulator body forming a first chamber and a second chamber, a first stage orifice disposed in the fluid flow path, a first stage seat, a second stage orifice disposed in the fluid flow path, and a second stage seat. A first stage control element is disposed within the fluid flow path and is shiftable between an open position spaced away from the first stage seat and a closed position seated against the first stage seat, with the first stage control element arranged to respond to fluid pressure changes to control flow of a process fluid through the first stage orifice. A second stage control element is disposed within the fluid flow path and is shiftable between an open position spaced away from the second stage seat and a closed position seated against the second stage seat, and an actuator is operatively coupled to the second stage control element and is arranged to respond to fluid pressure changes in the fluid outlet to move the second stage control element between the open position and the closed position to control flow of the process fluid through the second stage orifice. A first diaphragm includes a radially inner portion operatively coupled to the first stage control element, and a second diaphragm includes a radially inner portion operatively coupled to the first stage control element.

In accordance with a fourth exemplary aspect, a fluid regulator includes a regulator body having a fluid inlet and a fluid outlet connected by a fluid flow path, with a portion of the regulator body forming a first chamber and a second chamber, an orifice disposed in the fluid flow path, a seat, and a control element disposed within the fluid flow path and shiftable between an open position spaced away from the seat and a closed position seated against the seat, with the control element arranged to respond to fluid pressure changes to control flow of a process fluid through the orifice. A first diaphragm having a radially inner portion is operatively coupled to the control element, and a second diaphragm having a radially inner portion also is operatively coupled to the control element.

In further accordance with any one or more of the foregoing first, second, third, or fourth aspects, a dual stage regulator and/or method may further include any one or more of the following preferred forms.

In some preferred forms, the dual stage regulator may include an inlet fitting coupled to the regulator body, with the inlet fitting forming at least a portion of the first chamber, and wherein the first and second diaphragms are secured to the regulator body by the inlet fitting. Each of the first diaphragm and the second diaphragm may include a radially inner portion operatively coupled to the first stage control element, and the radially inner portion of the first diaphragm may be spaced axially from the radially inner portion of the second diaphragm. The first diaphragm may include a convolution, and may include a convex portion, and the convex portion may be oriented to face the second chamber.

In other preferred forms, the dual stage regulator may further include a first spring disposed in the first chamber and bearing against a first spring seat, with the first spring positioned to bias the first stage control element toward the open position, a second spring disposed in the second chamber and bearing against a second spring seat, with the second spring positioned to bias the first stage control element toward the closed position. The first diaphragm may include a radially inner portion secured between the first spring seat and the second spring seat, and the second diaphragm may include a radially inner portion engaging the second spring seat and spaced axially away from the radially inner portion of the first diaphragm. The regulator body may include a removable inlet fitting, with the inlet fitting forming the first chamber and including a central support, with the first spring seat including an inner portion and an outer portion, and with the inner portion sized to surround and slide along the central support. The outer portion may include a flange having an upstream face and a downstream face, with the inner portion of the second diaphragm bearing against the upstream face, and with the downstream face operatively coupled to the radially inner portion of the first diaphragm.

In still further preferred forms, the first stage control element may include a valve disc coupled to a disc holder disposed in the second chamber, and the second spring seat may be carried by the disc holder. The disc holder may include a central portion arranged to receive the valve disc, an outer flange forming the second spring seat, and a plurality of supports extending between the central portion and the outer flange, with the supports separated by flow apertures.

In preferred method forms, an axial space may be provided between the radially inner portion of the first diaphragm and the radially inner portion of the second diaphragm. The regulator body may include a removable inlet fitting forming at least a portion of the first chamber, and each of the first and second diaphragms may be provided with a radially outer portion, and the inlet fitting may be used to secure the radially outer portions to the regulator body. The first diaphragm may be provided with a convolution having a convex portion, and the convolution may be oriented to face toward the second chamber. The first spring seat may be provided with an inner portion and an outer portion, with the inner portion sized to surround and slide along the central support, the outer portion may be provided with a flange having an upstream face and a downstream face. The inner portion of the second diaphragm may be positioned to bear against the upstream face, and the downstream face may be positioned toward the radially inner portion of the first diaphragm. The method may include providing the first stage control element with a valve disc coupled to a disc holder, placing the disc holder in the second chamber, and providing the second spring seat on the disc holder. The method may further include providing the disc holder with a central portion arranged to receive the valve disc, providing the disc holder with an outer flange forming the second spring seat, and providing a plurality of supports separated by flow apertures and extending between the central portion and the outer flange. An inlet fitting may be removably coupled to the regulator body, with the inlet fitting securing the radially outer portion of the first and second diaphragms to the regulator body. The radially inner portion of the first and second diaphragms may be spaced apart axially relative to one another.

BRIEF DESCRIPTION OF THE DRAWINGS

FIG. 3A is an enlarged fragmentary cross-sectional view of a spring seat having an annular flange.

DETAILED DESCRIPTION

Although the following text sets forth a detailed description of one or more exemplary embodiments of the invention, it should be understood that the legal scope of the invention is defined by the words of the claims set forth at the end of this patent. The following detailed description is to be construed as exemplary only and does not describe every possible embodiment of the invention, as describing every possible embodiment would be impractical, if not impossible. Numerous alternative embodiments could be implemented, using either current technology or technology developed after the filing date of this patent, and such alternative embodiments would still fall within the scope of the claims defining the invention.

Figure 1:
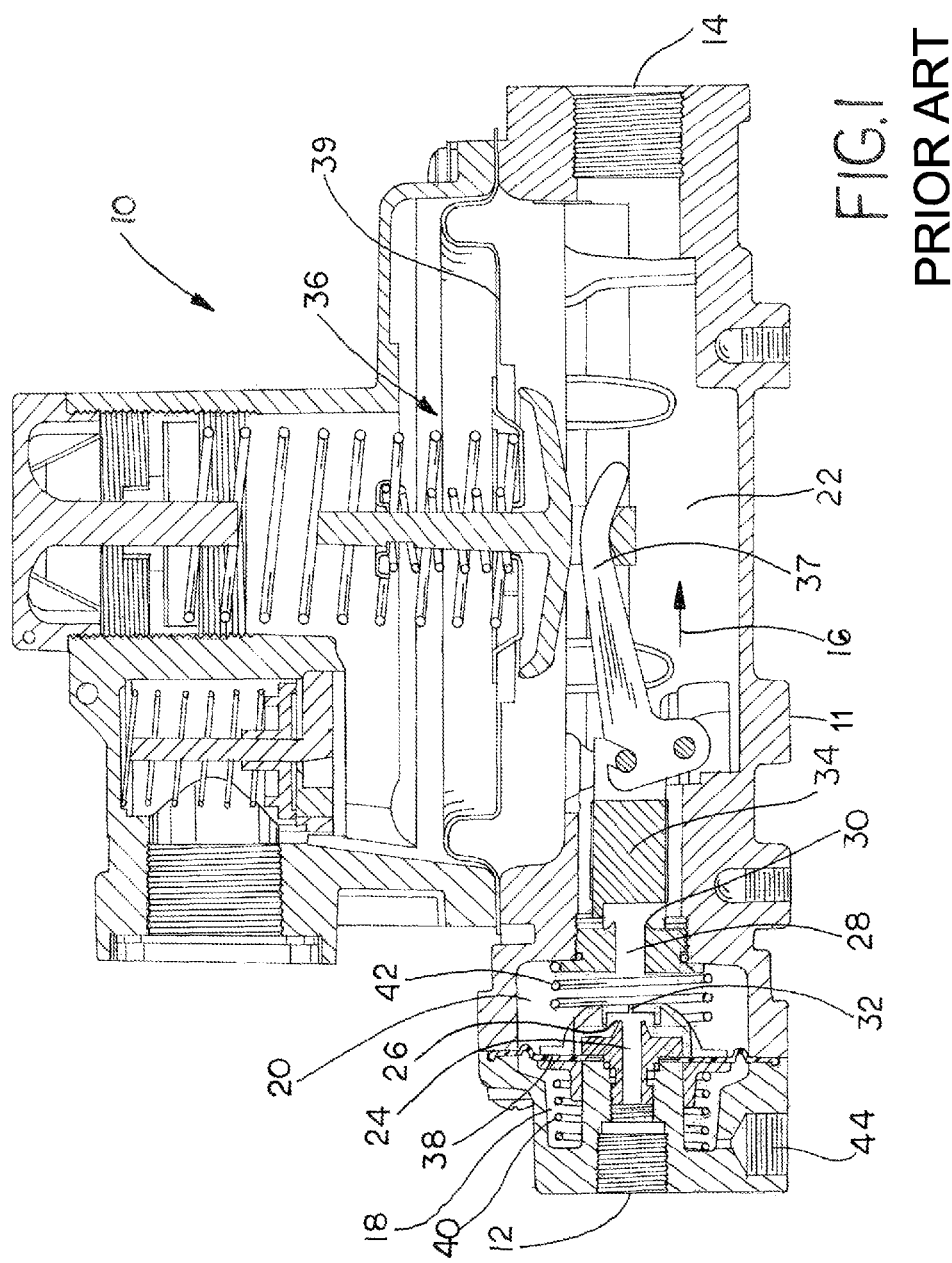
FIG. 1 is a cross-sectional view of a conventional two stage regulator assembled in accordance with the teachings of the prior art.

Referring now to the drawings, FIG. 1 illustrates a conventional dual stage fluid regulator 10. The fluid regulator 10 includes a regulator body 11 and includes a fluid inlet 12 and a fluid outlet 14, which are connected by a fluid flow path 16 which extends generally through the body 11. The fluid regulator is generally divided into a number of chambers, including a first chamber 18, a second chamber 20, and a third chamber 22. The fluid regulator 10 includes a first stage orifice 24 disposed in the fluid flow path 16 and leading to a first stage seat 26, and a second stage orifice 28 disposed in the fluid flow path 16 and leading to a second stage seat 30. A first stage control element 32 is disposed within the fluid flow path 16 and is shiftable between an open position (as shown in FIG. 1) in which the first stage control element is spaced away from the first stage seat 26, and a closed position in which the first stage control element is seated against the first stage seat 26 (in which the control element 16 would be positioned to the left of the open position of FIG. 1). The first stage control element 32 is arranged to respond to fluid pressure changes to control flow of a process fluid through the first stage orifice. A second stage control element 34 is disposed within the fluid flow path 16 and is shiftable between an open position (as shown in FIG. 1) in which the second stage control element 34 is spaced away from the second stage seat 30, and a closed position in which the second stage control element 34 is seated against the second stage seat 30. The fluid regulator 10 includes an actuator 36 which is attached the regulator body 11. The actuator 36 is attached to or otherwise operatively coupled to the second stage control element 34, and is arranged to respond to fluid pressure changes in the fluid outlet 14 to move the second stage control element 34 between the open position and the closed position, in order to control flow of the process fluid through the second stage orifice 28. The actuator 36 may be conventional, and moves a lever 37 operatively coupled to the second stage control element 34 in order to open or close the second stage control element, depending on pressure conditions in the chamber 22. The actuator 36 includes a diaphragm, load springs, and a suitable stem or other suitable linkage as would be known. The first stage control element is operatively coupled to a diaphragm 38, and the diaphragm 30 forms a pressure boundary between the chambers 18 and 20 when the first stage control element 32 is in the closed position. A spring 40 is disposed in the chamber 18 and bears against the control element 32 and applies a biasing load to the control element toward the open position, while another spring 42 is disposed in the chamber 20 and applies a biasing load to the control element 32 toward the closed position.

In operation, the inlet 12 is exposed to a supply pressure $P_i$, while the outlet 14 is exposed to an outlet or operating pressure $P_O$, which is the operating pressure required by the devices located downstream requiring gas at the lower operating pressure. The inlet pressure $P_i$ is higher than the outlet or operating pressure $P_o$. Typically, the chamber 18 is in flow communication with a vent 44 to atmosphere, and consequently the chamber 18 is at atmospheric pressure $P_a$. Finally, the chamber 20 is typically at a middle pressure $P_m$ between the inlet pressure and the outlet pressure. During operation, the inlet pressure is typically sufficiently high to keep the first stage control element 32 in the open position as shown in FIG. 1. If the inlet pressure drops sufficiently, then the pressure within the chamber 20 bearing against the diaphragm 38, with the assistance of the spring 42, causes the control element 32 to shift to the left toward, or to, the closed position, closing the first stage. Operation of the second stage is also conventional. When the pressure in the chamber 22 drops, meaning pressure at the gas devices downstream has dropped, the load springs in the actuator 36, which load springs bear against a diaphragm 39 of the actuator 36, overcome the gas pressure against the diaphragm. Consequently, the actuator moves the stem and/or diaphragm plate downward, rotating the lever 37 in a direction to move the second stage control element 34 away from the seat 30, feeding additional gas into the chamber 22. Conversely, when the pressure in the chamber 22 increases, the actuator causes the second stage control element 34 to move toward, or to, the seat 30, lowering the pressure on the chamber 22.

Figure 2:
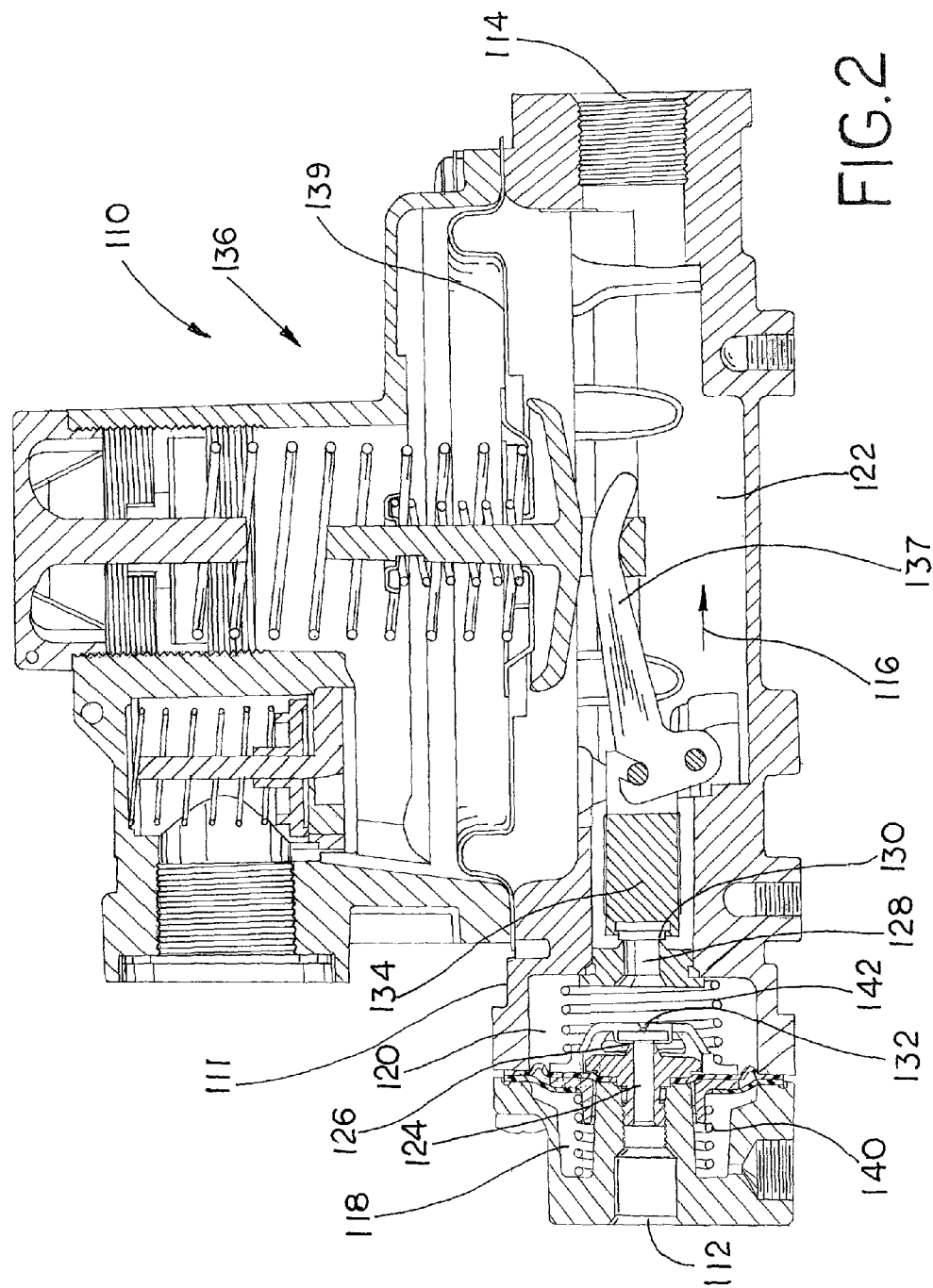
FIG. 2 is a cross-sectional view of a two stage regulator incorporating a dual diaphragm assembly assembled in accordance with the teachings of the present invention.

FIG. 2 illustrates a dual stage fluid regulator 110 assembled in accordance with the teachings of a disclosed example of the present invention. For ease of reference, and to the extent possible, the same or similar components will retain the same reference numbers as outlined above with respect to the conventional dual stage fluid regulator discussed above, although the reference numbers will be increased by 100. The fluid regulator 110 includes a regulator body 111 and includes a fluid inlet 112 and a fluid outlet 114, which are connected by a fluid flow path 116 which extends generally through the body 111. It will be understood that fluid flows through the fluid regulator 110 in a downstream direction toward the right when viewing the drawings, from an upstream end oriented toward the inlet 112 toward a downstream and oriented toward the outlet 114. The fluid regulator again is generally divided into a number of chambers, including a first chamber 118, a second chamber 120, and a third chamber 122. The fluid regulator 110 includes a first stage orifice 124 disposed in the fluid flow path 116 and leading to a first stage seat 126, and a second stage orifice 128 disposed in the fluid flow path 116 and leading to a second stage seat 130. The second stage seat 130 is formed by a second stage orifice fitting 131. In the example shown, the second stage orifice includes a tapered inlet 131a.

A first stage control element 132 is disposed within the fluid flow path 16 and is shiftable between an open position (similar to that shown in FIG. 1 with respect to the conventional regulator), in which the first stage control element 132 is spaced away from the first stage seat 126, and a closed position in which the first stage control element 132 is seated against the first stage seat 126 (as shown in FIG. 2). As with the conventional regulator discussed above, the first stage control element 132 is arranged to respond to fluid pressure changes to control flow of a process fluid through the first stage orifice 124.

A second stage control element 134 is disposed within the fluid flow path 116 and is shiftable between an open position (similar to that shown in FIG. 1 in conjunction with the conventional regulator) in which the second stage control element 134 is spaced away from the second stage seat 130, and a closed position in which the second stage control element 134 is seated against the second stage seat 130 (as shown in FIG. 2). The fluid regulator 110 includes an actuator 136 which is attached the regulator body 111. The actuator 136 is attached to or otherwise operatively coupled to the second stage control element 134, and is arranged to respond to fluid pressure changes in the fluid outlet 114 to move the second stage control element 134 between the open position and the closed position, in order to control flow of the process fluid through the second stage orifice 128. The actuator 136 may be conventional, and moves a lever 137 operatively coupled to the second stage control element 134 in order to open or close the second stage control element 134, depending on pressure conditions in the chamber 122. The actuator 136 includes a diaphragm 139, load springs, and a suitable stem or other suitable linkage as would be known, in order to convert the up and down movement of the diaphragm into appropriate movement of the second stage control element 134.

The first stage control element 132 is operatively coupled to a first diaphragm 138, and the first diaphragm 138 forms a pressure boundary between the chambers 118 and 120 when the first stage control element 132 is in the closed position of FIG. 2. The first stage control element also includes a second diaphragm 150, and the second diaphragm 150 is disposed in the chamber 118. A spring 140 also is disposed in the chamber 118, and bears against the control element 132 in order to apply a biasing load to the control element 132 toward the open position. Another spring 142 is disposed in the chamber 120 and applies a biasing load to the control element 132 toward the closed position.

Figure 3:
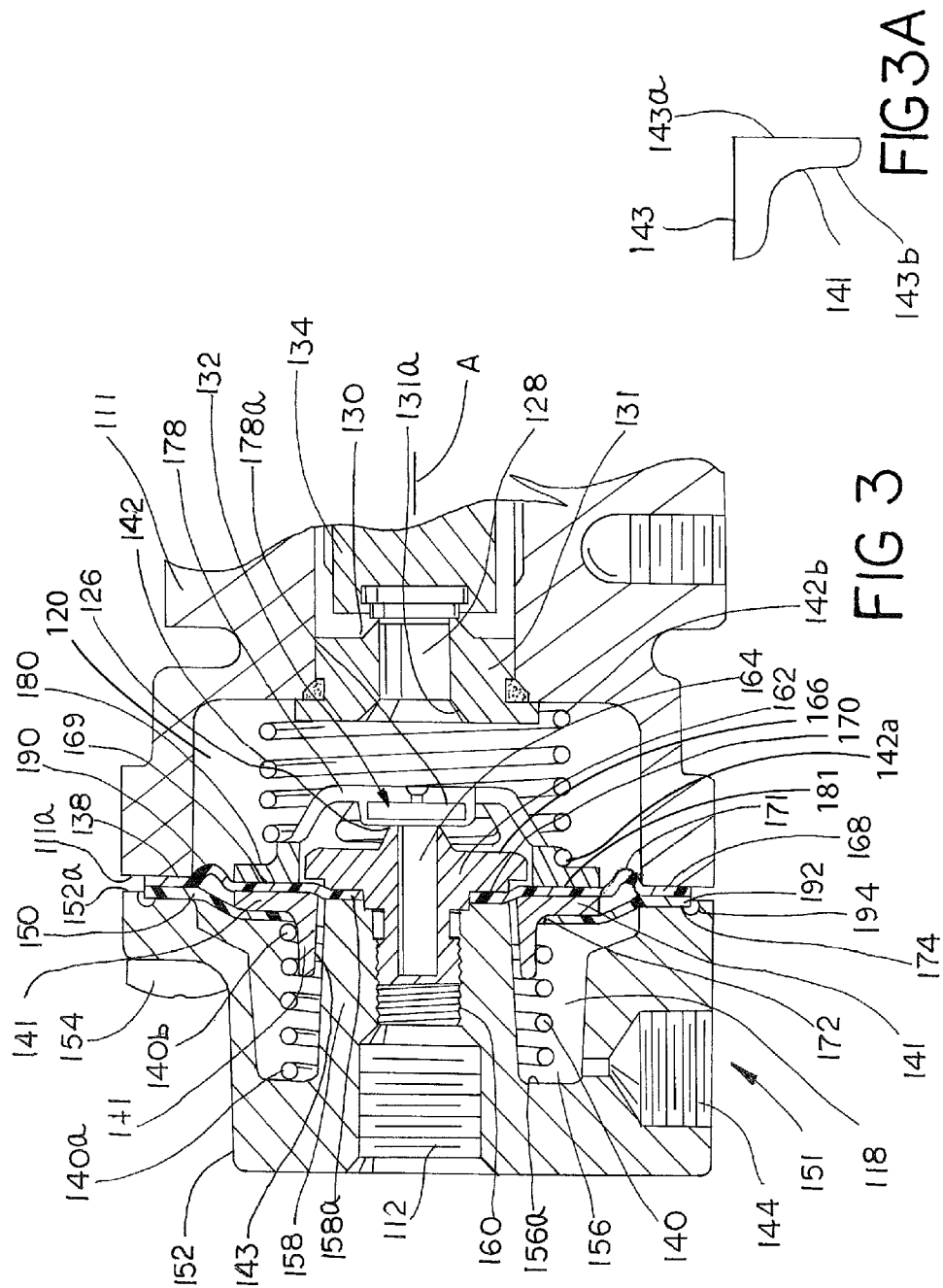
FIG. 3 is an enlarged fragmentary cross-sectional view of the inlet portion of the two stage regulator and illustrating the dual diaphragm assembly assembled in accordance with the teachings of the present invention.

Referring now to FIG. 3, the regulator body 111 preferably includes an inlet fitting 152, which may be secured to the balance of the regulator body 111 by, for example, a plurality of threaded fasteners or bolts 154, or by any other suitable means. The inlet fitting 152 includes an internal recess 156 generally forming chamber 118, and also includes a generally cylindrical central portion 158 having a threaded bore 160 in flow communication with the inlet 112. A first stage orifice fitting 162 is threaded into the threaded bore 160, with the first stage orifice fitting 162 including a central bore 164 generally defining the first page orifice 124. The first stage orifice fitting 162 also includes a downstream end generally defining the first stage seat 126. In the example shown, the first stage orifice fitting 162 includes an annular flange 166 which extends in a generally radially outward direction relative to a central axis A.

In the example shown, the diaphragm 138 includes a radially outward portion 168 and a radially inward portion 170. The diaphragm 138 also includes a middle portion 169 disposed between the portions 168 and 170. The diaphragm 138 also includes a convolution 171 having a convex portion which, in the disclosed example, is oriented toward the chamber 120. Similarly, the diaphragm 150 includes a radially inward portion 172 and a radially outward portion 174, and further includes a middle portion disposed between the portions 172 and 174. The radially outward portion 168 of the diaphragm 138 and the radially outward portion 174 of the diaphragm 150 are secured to the regulator body 111 by the inlet fitting 152. More specifically, the diaphragms 138 and 150 are sized such that the radially outward portions 168 and 174 extend between cooperating mounting faces 152a and 111a on the inlet fitting 152 and the regulator body 111, respectively. The radially inward portion of the diaphragm 138 is secured to a surface 158a of the central portion 158 of the inlet fitting 152 by the annular flange 166 of the first stage orifice fitting 162.

The spring 140 includes an upstream end 140a bearing against an inner surface 156a of the recess 156, and a downstream end 140b bearing against a spring seat 141. The spring seat 141 includes an aperture 143 sized to fit over the central portion 158 of the inlet fitting 152. The spring 142 includes an upstream end 142a bearing against an annular flange 180 coupled to the first stage control element 132, and also includes a downstream end 142b bearing against a portion of the regulator body 111 disposed within the chamber 120. A face of the annular flange 180 forms a spring seat 181. As shown in FIG. 3A, the spring seat 141 is shown in fragmentary form, and includes an outer or annular flange 143 having opposing surfaces 143a and 143b. In the example shown, the surface 143b forms the spring seat 141.

Taken together, the diaphragm 138 and the diaphragm 150 form a dual diaphragm assembly 151. The assembly may also be modified to include more than two diaphragms. The diaphragm 138 acts in a manner similar to that of the diaphragm 38 in the convention regulator, while the diaphragm 150 acts as a dampener, dampening the movement of the first stage control element 132 toward and away from the first stage seat 126. Taken together, the diaphragm assembly 151 has a greater dampening effect on the movement of the first stage control element 132 toward and/or away from the first seat 126 than would be achievable with only a single diaphragm.

Figure 4:
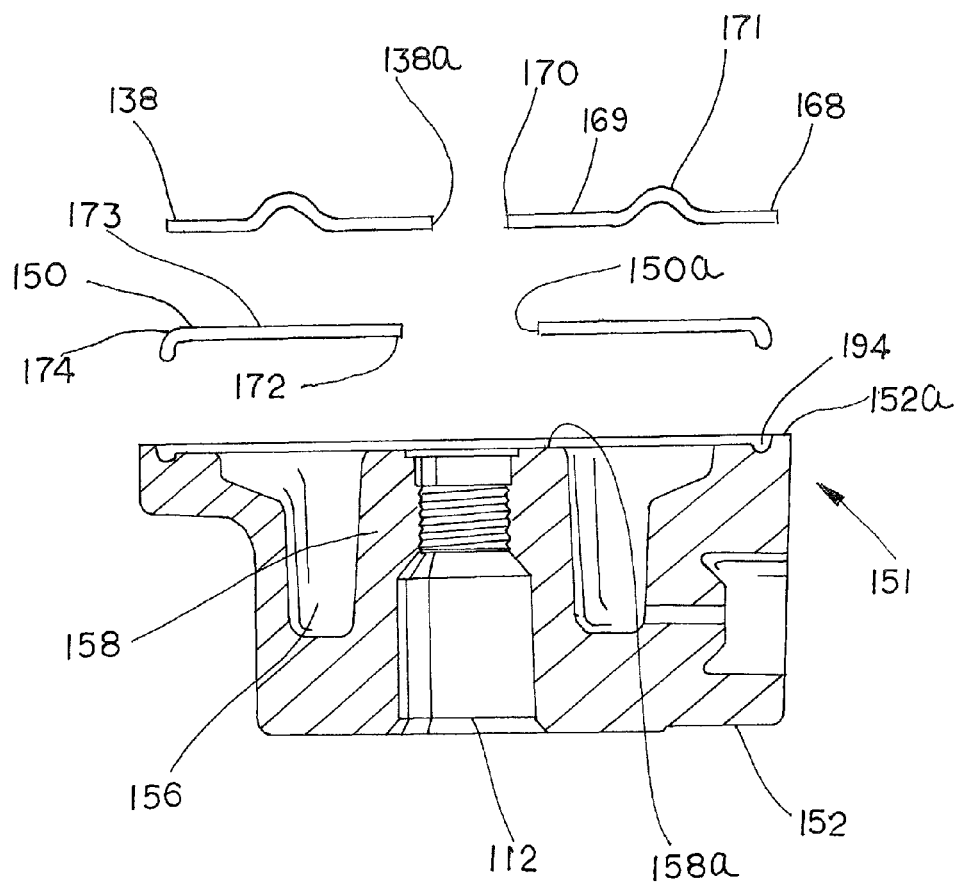
FIG. 4 is an enlarged fragmentary exploded view illustrating two diaphragms of the dual diaphragm assembly adjacent the inlet fitting.

Referring now to the enlarged exploded view of FIG. 4, the inlet fitting 152 and the diaphragms 138 and 150 are shown in greater detail. The diaphragm 138 includes a central aperture 138a. The central aperture 138 is sized to fit around the first stage orifice fitting 162, such that the radially inward portion 170 of the diaphragm 138 is held in place between the flange 166 of the orifice fitting and the surface 158a of the central portion 158. When so secured, the middle portion 169 of the diaphragm 138 is disposed between the surface 143a of the spring seat 141, and the surface 180b of the annular flange 180 of the disc holder 178. The diaphragm 150 includes a middle portion 173 disposed between the inward and outward portions 172 and 174. When the diaphragm 150 is disposed as shown in FIG. 3, the middle portion 173 is disposed between in the chamber 118, between the spring seat 141 and the surrounding wall of the chamber 118.

Referring still to FIG. 4, the diaphragm 150 includes a central aperture 150a, which is sized to fit around the spring seat 143, with the radially inward portion engaging the surface 143b of the spring seat 141. Consequently, the radially inner portion of the diaphragm 150 is operatively coupled to the first stage control element 132, due to the fact that the radially inward portion 172 will move along the axis A as the first stage control element 132 moves along the axis A toward and away from the first stage seat 126. It will be understood that the spring seat 141 and the annular flange 180 of the first stage control element 132 move in conjunction with one another in a generally axial direction as the first stage control element 132 moves toward and away from the seat 126.

In accordance with the disclosed example, the provision of the diaphragm 150 (i.e., the addition of a second diaphragm), allows the diaphragm 150 to act as a dampening diaphragm. In effect, the diaphragm 150 dampens or inhibits the movement of the first stage control element 132 toward and away from the first stage seat 126. The radially outer portion 174 of the second diaphragm 158 may also include an annular protrusion 192, which may be sized to fit within a corresponding annular channel 194 formed in the inlet fitting 152. In the example shown, the radially outward portions 168 and 174 of the diaphragms 138 and 150, respectively, are sized to extend between the surface 152a of the inlet fitting 152 and the surface 111a of the regulator body, to allow the radially outward portions to be retained in place.

Figure 5:
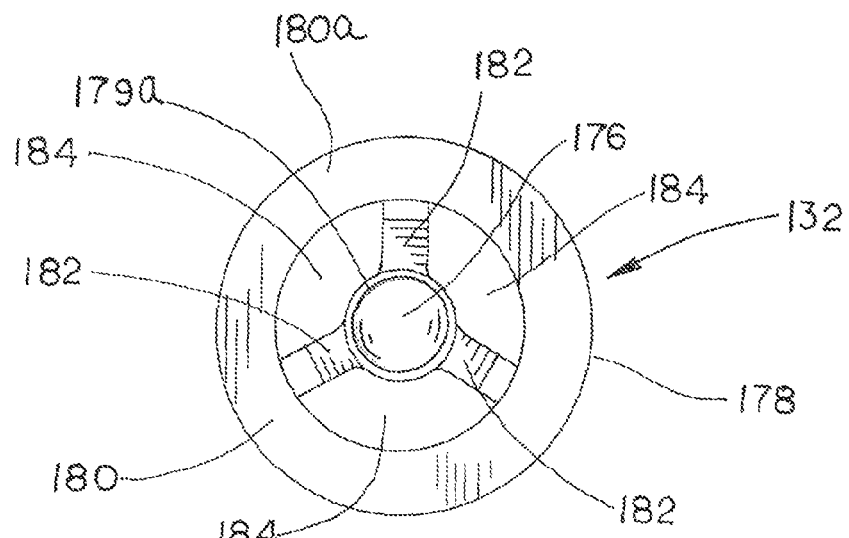
FIG. 5 is an enlarged front side elevational view of a disc holder assembled in accordance with the teachings of the present invention.
Figure 6:
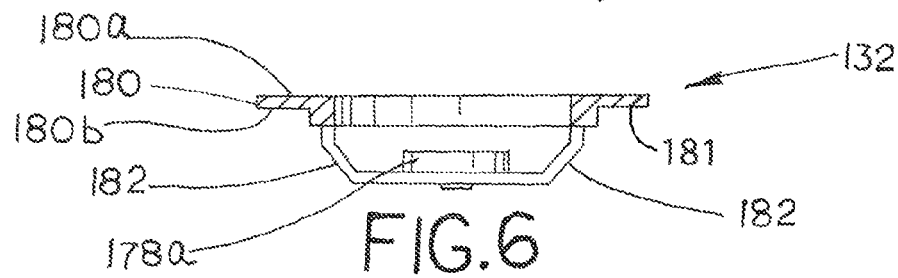
FIG. 6 is a side view of the disc holder of FIG. 5.
Figure 7:
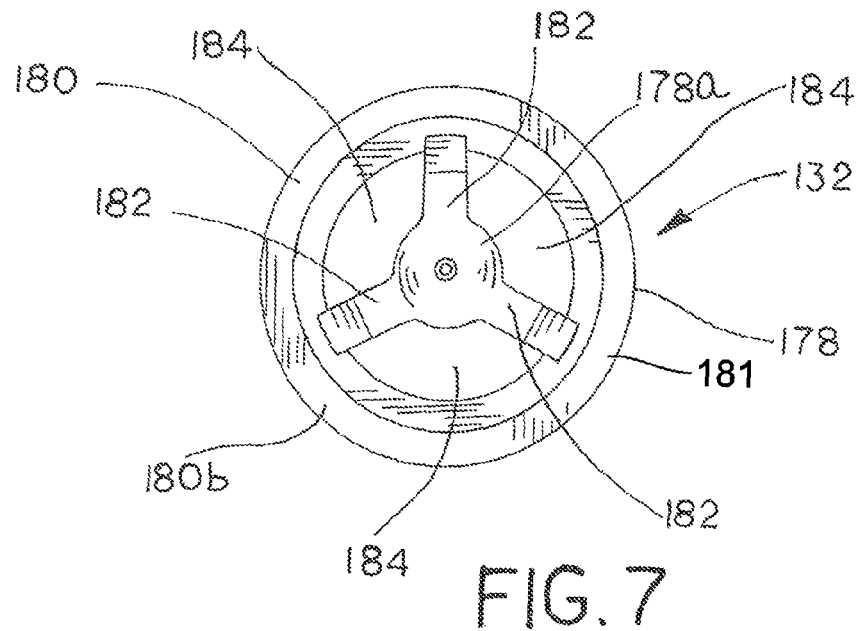
FIG. 7 is a rear side elevational view of the disc holder of FIG. 5.

Referring now to FIGS. 5, 6 and 7, the first stage control element 132 is shown in greater detail and includes a valve disc 176 carried by a disc holder 178. The disc holder 178 includes a receiving area 178a disposed in a radially central portion of the disc holder 178. The disc holder 178 also includes an annular flange 180 having a face 180a and a face 180b, and the face 180b forms the spring seat 181. A plurality of supports 182 extend in a generally radially direction between the receiving area 178a and the annular flange 180. The supports 182 are separated by flow apertures 184. In the example shown, the face 180b forms the spring seat for the spring 142. As shown in FIG. 6, the annular flange 180 is disposed along a first plane, while the receiving area 178a and the valve disc 178 are disposed along a different plane spaced away from the first plane.

Referring again to FIG. 3, the middle portion 169 of the diaphragm 138 is disposed between the spring seat 141 and the annular flange 180. Specifically, the middle portion 169 of the diaphragm 138 Intel between the face 143a of the spring seat 141 and the face 180a of the annular flange 180 of the disc holder 178. It will be understood that the spring seat 141 and the disc holder 178 are free to move slightly in an axial direction parallel to the axis A as the first stage control element 132 moves toward and away from the first stage seat 126. It will also be understood that the middle portion 169 of the diaphragm 138 also moves in an axial direction as the spring seat 141 and the disc holder 178 move axially along the axis A.

Referring still to FIG. 3, the radially inner portion 172 of the diaphragm 150 engages the face 143b of the spring seat 141. In accordance with one or more preferred forms, the radially inner portion 172 of the diaphragm 150 may be secured to the face 143b of the spring seat 141. In any event, an axial space is defined between the middle portion of the diaphragm 138 secured between the spring seat 141 and flange 180, and the radially inner portion 172 of the diaphragm 150, as the relevant portions of the two diaphragms are separated by thickness of the spring seat 141. A chamber 190 may be formed between portions of the two diaphragms 138 and 150.

In operation, once again the inlet 112 is exposed to a supply pressure $P_i$, while the outlet 114 is exposed to an outlet or operating pressure $P_O$, which is the operating pressure required by the devices located downstream requiring gas at the lower operating pressure. The inlet pressure $P_i$ is higher than the outlet or operating pressure $P_o$. Typically, the chamber 118 is in flow communication with a vent 144 to atmosphere, and consequently the chamber 118 is at atmospheric pressure $P_a$. Finally, the chamber 120 is typically at a middle pressure $P_m$ between the inlet pressure and the outlet pressure. During operation, the inlet pressure is typically sufficiently high to keep the first stage control element 132 in the open position as (similar to that shown in FIG. 1). If the inlet pressure drops sufficiently, then the pressure within the chamber 120 bearing against the diaphragm 138, with the assistance of the spring 142, causes the control element 132 to shift to the left toward, or to, the closed position of FIG. 2, closing the first stage. Once again, operation of the second stage is conventional. When the pressure in the chamber 122 drops, meaning pressure at the gas devices downstream has dropped, the load springs in the actuator 136, which load springs bear against a diaphragm 139 of the actuator 136, overcome the gas pressure against the diaphragm. Consequently, the actuator moves the stem and/or diaphragm plate downward, rotating the lever 137 in a direction appropriate to move the second stage control element 134 away from the seat 130, feeding additional gas into the chamber 122. Conversely, when the pressure in the chamber 122 increases, the actuator causes the second stage control element 134 to move toward, or to, the seat 130, lowering the pressure on the chamber 122. As outlined above, the diaphragm 150 dampens the axial movement of the first stage control element 132.

When assembled in accordance with the teachings of the disclosed example, the fluid regulator 110 may experience improved flow and/or improved flow stability, and may prove especially useful in relatively small or otherwise compact first stage regulators, or in dual stage regulators. The provision of dual or multiple diaphragms operatively coupled to the first stage control element may allow for greater flow and may counteract reduce and/or eliminate high-frequency instability often created by higher flow rates. The dual or multiple diaphragm arrangement creates additional friction or resistance to movement of the first stage control element, and consequently the provision of a second diaphragm has a dampening effect on movement of the control element. Additionally, the provision of a second or dampening diaphragm, the first stage disc holder may be sized to have less restriction to flow, which consequently allows the use of larger diameter flow orifices. The resulting fluid regulator displays flow capacities that are more consistent, and the flow capacity is more resistant to the potentially adverse effects of gas impurities. The disclosed fluid regulator also may experience superior flow performance at low temperatures. Consequently, the disclosed fluid regulator experiences improved performance and increased resistance to known adverse environmental factors.

When assembled in accordance with the teachings of the disclosed example, the convolution 171 on the diaphragm 138 may be oriented such that the convex portion of the convolution is facing the chamber 120, such that the convolution is exposed to the pressure $P_m$ in the chamber 120, which is typically a pressure higher than the atmospheric pressure $P_a$ in the chamber 118. Alternatively, the convolution may be oriented to face the chamber 118.

In accordance with the disclosed example, the present invention may allow the ready conversion of a conventional single or dual stage regulator to a regulator incorporating the multiple or dual diaphragm assembly 151, using predominantly existing components from the conventional regulator. Upon providing a conventional regulator, the existing inlet fitting is removed to access the first stage of the device. The existing diaphragm may be used, or the convoluted diaphragm 138 may be used. After installation or re-installation of the spring 142 and the disc holder, such as the disc holder 178, the diaphragm 138 is secured in place as outlined above between the flange 166 of the orifice fitting 162 and the appropriate surface 158a of the central portion 158, such that the middle portion of the first diaphragm is coupled to the first stage control element. The second diaphragm is provided, and the radially inner portion of the second diaphragm is coupled to the spring seat 141, such that the diaphragm 150 is effectively coupled to the first stage control element 132.

As outlined above, the dual diaphragm assembly 151 may use two or more diaphragms. Also, one or both of the diaphragms may be lubricated, and/or locations where one or both of the diaphragms engage the relevant control element and/or the surrounding structures may be lubricated. The addition of lubrication may alter the dampening effect of the second diaphragm, allowing the dampening effect to effectively be tuned by the user.

It will be understood that with the inclusion of the dual diaphragm assembly 151, the apertures 184 in the disc holder may be made larger, due to the greater stability afforded by the dampening effect of the dual diaphragm assembly 151. Also, due to the greater stability, the flow orifices 124 and 128 may be larger or smaller as desired. By adjusting the size of the relevant flow areas, flow may be manipulated or routed around or through the relevant apertures and orifices in order to further reduce, eliminate, or minimize any instability.

While certain representative embodiments and details have been shown for purposes of illustrating the invention, it will be apparent to those skilled in the art that various changes in the methods and apparatus disclosed herein may be made without departing from the scope of the invention.

What is claimed:

1. A dual stage fluid regulator comprising:
    a regulator body having a fluid inlet and a fluid outlet connected by a fluid flow path, a portion of the regulator body forming a first chamber and a second chamber;
    a first stage orifice carried by a first stage orifice fitting and disposed in the fluid flow path and leading to a first stage seat;
    a second stage orifice disposed in the fluid flow path and leading to a second stage seat;
    a first stage control element disposed within the fluid flow path and shiftable between an open position spaced away from the first stage seat and a closed position seated against the first stage seat, the first stage control element arranged to respond to fluid pressure changes to control flow of a process fluid through the first stage orifice;
    a second stage control element disposed within the fluid flow path and shiftable between an open position spaced away from the second stage seat and a closed position seated against the second stage seat;
    an actuator attached to the regulator body, the actuator operatively coupled to the second stage control element and arranged to respond to fluid pressure changes in the fluid outlet to move the second stage control element between the open position and the closed position to control flow of the process fluid through the second stage orifice; and wherein the first stage control element is operatively coupled to a first diaphragm and a second diaphragm, the first and second diaphragms disposed between the first chamber and the second chamber;

an inlet fitting coupled to the regulator body, the inlet fitting forming at least a portion of the first chamber;

wherein the first diaphragm includes a radially inner portion, the radially inner portion of the first diaphragm secured between the inlet fitting and the first stage orifice fitting.

2. The dual stage regulator of claim 1, wherein the first and second diaphragms are secured to the regulator body by the inlet fitting.

3. The dual stage regulator of claim 2, wherein the first diaphragm includes a convolution having a convex portion, and wherein the convex portion faces the second chamber.

4. The dual stage regulator of claim 2, wherein the second diaphragm includes a radially inner portion operatively coupled to the first stage control element.

5. The dual stage regulator of claim 4, wherein, the radially inner portion of the first diaphragm is spaced axially from the radially inner portion of the second diaphragm.

6. A dual stage fluid regulator comprising:
a regulator body having a fluid inlet and a fluid outlet connected by a fluid flow path, a portion of the regulator body forming a first chamber and a second chamber;
a first stage orifice disposed in the fluid flow path and leading to a first stage seat;
a second stage orifice disposed in the fluid flow path and leading to a second stage seat;
a first stage control element disposed within the fluid flow path and shiftable between an open position spaced away from the first stage seat and a closed position seated against the first stage seat, the first stage control element arranged to respond to fluid pressure changes to control flow of a process fluid through the first stage orifice;
a second stage control element disposed within the fluid flow path and shiftable between an open position spaced away from the second stage seat and a closed position seated against the second stage seat;
an actuator attached to the regulator body, the actuator operatively coupled to the second stage control element and arranged to respond to fluid pressure changes in the fluid outlet to move the second stage control element between the open position and the closed position to control flow of the process fluid through the second stage orifice; and
wherein the first stage control element is operatively coupled to a first diaphragm and a second diaphragm, the first and second diaphragms disposed between the first chamber and the second chamber;
a first spring disposed in the first chamber and bearing against a first spring seat, the first spring positioned to bias the first stage control element toward the open position;
a second spring disposed in the second chamber and bearing against a second spring seat, the second spring positioned to bias the first stage control element toward the closed position;
the first diaphragm including a radially inner portion secured between the first spring seat and the second spring seat;
the second diaphragm including a radially inner portion engaging the second spring seat and spaced axially away from the radially inner portion of the first diaphragm.

7. The dual stage regulator of claim 6, wherein the regulator body includes a removable inlet fitting, the inlet fitting forming the first chamber and including a central support, the first spring seat including an inner portion and an outer portion, the inner portion sized to surround and slide along the central support, the outer portion including a flange having an upstream face and a downstream face, the inner portion of the second diaphragm bearing against the upstream face, the downstream face operatively coupled to the radially inner portion of the first diaphragm.

8. The dual stage regulator of claim 6, wherein the first stage control element includes a valve disc coupled to a disc holder disposed in the second chamber, and wherein the second spring seat is carried by the disc holder.

9. The dual stage regulator of claim 8, wherein the disc holder includes a central portion arranged to receive the valve disc, an outer flange forming the second spring seat, and a plurality of supports extending between the central portion and the outer flange, the supports separated by flow apertures.

10. A method of improving stability in a dual stage regulator, the method comprising:
providing a conventional dual stage fluid regulator having a regulator body, a fluid inlet and a fluid outlet connected by a fluid flow path with a portion of the regulator body forming a first chamber and a second chamber, the regulator further having a first stage orifice disposed in the fluid flow path and leading to a first stage seat, a second stage orifice disposed in the fluid flow path and leading to a second stage seat, a first stage control element disposed within the fluid flow path and shiftable between an open position spaced away from the first stage seat and a closed position seated against the first stage seat, the first stage control element arranged to respond to fluid pressure changes to control flow of a process fluid through the first stage orifice, and a second stage control element disposed within the fluid flow path and shiftable between an open position spaced away from the second stage seat and a closed position seated against the second stage seat, the regulator further having an actuator attached to the regulator body, the actuator operatively coupled to the second stage control element and arranged to respond to fluid pressure changes in the fluid outlet to move the second stage control element between the open position and the closed position to control flow of the process fluid through the second stage orifice;
providing a first diaphragm;
positioning the first diaphragm between the first chamber and the second chamber;
coupling a radially inner portion of the first diaphragm to the first stage control element;
providing a second diaphragm; coupling a radially inner portion of the second diaphragm to the first stage control element;
positioning a first spring in the first chamber and bearing against a first spring seat, the first spring positioned to bias the first stage control element toward the open position;
positioning a second spring disposed in the second chamber and bearing against a second spring seat, the second spring positioned to bias the first stage control element toward the closed position;
providing the first diaphragm with a radially inner portion and securing the radially inner portion between the first spring seat and the second spring seat;

providing the second diaphragm with a radially inner portion engaging the second spring seat, and spacing the second diaphragm axially away from the radially inner portion of the first diaphragm.

11. The method of claim 10, wherein the regulator body includes a removable inlet fitting forming at least a portion of the first chamber; and
providing each of the first and second diaphragms with a radially outer portion, and using the inlet fitting to secure the radially outer portions to the regulator body.

12. The method of claim 10, including providing first diaphragm with a convolution having a convex portion, and orienting the convolution to face toward the second chamber.

13. A method of improving stability in a dual stage regulator, the method comprising:
providing a conventional dual stage fluid regulator having a regulator body, a fluid inlet and a fluid outlet connected by a fluid flow path with a portion of the regulator body forming a first chamber and a second chamber, the regulator further having a first stage orifice disposed in the fluid flow path and leading to a first stage seat, a second stage orifice disposed in the fluid flow path and leading to a second stage seat, a first stage control element disposed within the fluid flow path and shiftable between an open position spaced away from the first stage seat and a closed position seated against the first stage seat, the first stage control element arranged to respond to fluid pressure changes to control flow of a process fluid through the first stage orifice, and a second stage control element disposed within the fluid flow path and shiftable between an open position spaced away from the second stage seat and a closed position seated against the second stage seat, the regulator further having an actuator attached to the regulator body, the actuator operatively coupled to the second stage control element and arranged to respond to fluid pressure changes in the fluid outlet to move the second stage control element between the open position and the closed position to control flow of the process fluid through the second stage orifice;
providing a first diaphragm;
positioning the first diaphragm between the first chamber and the second chamber;
coupling a radially inner portion of the first diaphragm to the first stage control element;
providing a second diaphragm; and
coupling a radially inner portion of the second diaphragm to the first stage control element;
wherein the regulator body includes a removable inlet fitting forming at least a portion of the first chamber;
providing each of the first and second diaphragms with a radially outer portion, and using the inlet fitting to secure the radially outer portions to the regulator body; and
wherein the regulator includes a first spring disposed in the first chamber and bearing against a first spring seat and biasing the first stage control element toward the open position, a second spring disposed in the second chamber and bearing against a second spring seat and biasing the first stage control element toward the closed position, and the inlet fitting forming the first chamber and including a central support, and
providing the first spring seat with an inner portion and an outer portion, the inner portion sized to surround and slide along the central support;
providing the outer portion with a flange having an upstream face and a downstream face;
positioning the inner portion of the second diaphragm to bear against the upstream face; and
positioning the downstream face toward the radially inner portion of the first diaphragm.

14. The method of claim 13, including providing the first stage control element with a valve disc coupled to a disc holder, placing the disc holder in the second chamber, and providing the second spring seat on the disc holder.

15. The method of claim 14, providing the disc holder with a central portion arranged to receive the valve disc, providing the disc holder with an outer flange forming the second spring seat, and providing a plurality of supports separated by flow apertures and extending between the central portion and the outer flange.

16. A dual stage fluid regulator comprising:
a regulator body having a fluid inlet and a fluid outlet connected by a fluid flow path, with a portion of the regulator body forming a first chamber and a second chamber;
a first stage orifice disposed in the fluid flow path;
a first stage seat;
a second stage orifice disposed in the fluid flow path;
a second stage seat;
a first stage control element disposed within the fluid flow path and shiftable between an open position spaced away from the first stage seat and a closed position seated against the first stage seat, the first stage control element arranged to respond to fluid pressure changes to control flow of a process fluid through the first stage orifice;
a second stage control element disposed within the fluid flow path and shiftable between an open position spaced away from the second stage seat and a closed position seated against the second stage seat;
an actuator operatively coupled to the second stage control element and arranged to respond to fluid pressure changes in the fluid outlet to move the second stage control element between the open position and the closed position to control flow of the process fluid through the second stage orifice;
a first diaphragm having a radially inner portion operatively coupled to the first stage control element; and
a second diaphragm having a radially inner portion operatively coupled to the first stage control element; and
wherein the radially inner portion of the first diaphragm is spaced axially away from the radially inner portion of the second diaphragm;
and further wherein the radially inner portion of the first diaphragm and the radially inner portion of the second diaphragm are disposed in opposite sides of a spring seat coupled to a spring.

17. The dual stage regulator of claim 16, the first and second diaphragms each including a radially outer portion, and including an inlet fitting removably coupled to the regulator body, the inlet fitting securing the radially outer portion of the first and second diaphragms to the regulator body.

18. The dual stage regulator of claim 17, wherein the first diaphragm includes a convolution having a convex portion, and wherein the convex portion faces the second chamber.

19. A dual stage fluid regulator comprising:
a regulator body having a fluid inlet and a fluid outlet connected by a fluid flow path, with a portion of the regulator body forming a first chamber and a second chamber;
a first stage orifice disposed in the fluid flow path;
a first stage seat;
a second stage orifice disposed in the fluid flow path;
a second stage seat;

a first stage control element disposed within the fluid flow path and shiftable between an open position spaced away from the first stage seat and a closed position seated against the first stage seat, the first stage control element arranged to respond to fluid pressure changes to control flow of a process fluid through the first stage orifice;

a second stage control element disposed within the fluid flow path and shiftable between an open position spaced away from the second stage seat and a closed position seated against the second stage seat;

an actuator operatively coupled to the second stage control element and arranged to respond to fluid pressure changes in the fluid outlet to move the second stage control element between the open position and the closed position to control flow of the process fluid through the second stage orifice;

a first diaphragm having a radially inner portion operatively coupled to the first stage control element;

a second diaphragm having a radially inner portion operatively coupled to the first stage control element; and including a first spring disposed in the first chamber and bearing against a first spring seat and positioned to bias the first stage control element toward the open position, a second spring disposed in the second chamber and bearing against a second spring seat and positioned to bias the first stage control element toward the closed position;

wherein the radially inner portion of the first diaphragm is secured between the first spring seat and the second spring seat; and wherein the radially inner portion of the second diaphragm engages the second spring seat and is spaced axially away from the radially inner portion of the first diaphragm.

20. The dual stage regulator of claim 19, wherein the regulator body includes a removable inlet fitting, the inlet fitting forming the first chamber and including a central support, the first spring seat including an inner portion and an outer portion, the inner portion sized to surround and slide along the central support, the outer portion including a flange having an upstream face and a downstream face, the inner portion of the second diaphragm bearing against the upstream face, the downstream face operatively coupled to the radially inner portion of the first diaphragm.

* * * * *